United States Patent
Shintani et al.

(10) Patent No.: US 12,069,323 B2
(45) Date of Patent: Aug. 20, 2024

(54) SIGNALING CHANGES IN ASPECT RATIO OF MEDIA CONTENT

(71) Applicant: SONY GROUP CORPORATION, Tokyo (JP)

(72) Inventors: Peter Shintani, San Diego, CA (US); Adam Goldberg, Fairfax, VA (US)

(73) Assignee: SONY GROUP CORPORATION, Tokyo (JP)

( * ) Notice: Subject to any disclaimer, the term of this patent is extended or adjusted under 35 U.S.C. 154(b) by 6 days.

(21) Appl. No.: 17/886,960

(22) Filed: Aug. 12, 2022

(65) Prior Publication Data
US 2024/0056617 A1 Feb. 15, 2024

(51) Int. Cl.
*H04N 21/235* (2011.01)
*H04N 21/431* (2011.01)
*H04N 21/8547* (2011.01)

(52) U.S. Cl.
CPC ..... *H04N 21/2353* (2013.01); *H04N 21/4318* (2013.01); *H04N 21/8547* (2013.01)

(58) Field of Classification Search
CPC .......... H04N 21/2353; H04N 21/4318; H04N 21/8547
See application file for complete search history.

(56) References Cited

U.S. PATENT DOCUMENTS

| | | | |
|---|---|---|---|
| 2018/0115741 A1* | 4/2018 | Greene | H04N 21/4755 |
| 2021/0058671 A1* | 2/2021 | Yu | H04N 21/44008 |
| 2022/0046316 A1* | 2/2022 | Wright | H04H 20/14 |

FOREIGN PATENT DOCUMENTS

WO 2006/112808 A1 10/2006

OTHER PUBLICATIONS

"Recommended Practice: Guide to the Use of the ATSC Digital Television Standard, including Corrigendum No. 1", Advanced Television Systems Committee, Doc. A/54A, Dec. 4, 2003, 110 pages.
"ATSC Recommended Practice: Conversion of ATSC 3.0 Services for Redistribution", Advanced Television Systems Committee, Doc. A/370:2019, Dec. 11, 2019, 55 pages.

* cited by examiner

*Primary Examiner* — Mulugeta Mengesha
(74) *Attorney, Agent, or Firm* — CHIP LAW GROUP

(57) ABSTRACT

A system and method for signaling changes in aspect ratio of media content is provided. The system acquires a video stream to be transmitted to an electronic device and determines aspect ratio information associated with content included in the video stream. The system further determines a change in an aspect ratio of the content based on the aspect ratio information. The change in the aspect ratio may be from a first value at a first timestamp to a second value at a second timestamp for a duration of the content. The system signals information indicative of the determined change to the electronic device.

18 Claims, 5 Drawing Sheets

SIGNALING CHANGES IN ASPECT RATIO OF MEDIA CONTENT

CROSS-REFERENCE TO RELATED APPLICATIONS/INCORPORATION BY REFERENCE

None.

FIELD

Various embodiments of the disclosure relate to content streaming and playback. More specifically, various embodiments of the disclosure relate to a system and a method for signaling changes in aspect ratio of media content.

BACKGROUND

Services based on OTT formats, ATSC, or other similar broadcast standards typically support multiple aspect ratios. In some instances, the aspect ratio of video content can change suddenly while rendering the video content. This sudden change in the aspect ratio of video content may degrade a viewing experience of the user or may even result in some discomfort due to the sudden discontinuity. Typically, changes in the aspect ratio occur between 4:3 and 16:9 content (e.g., between SD video and HD video). In several television systems (e.g., US Cable and US Broadcast TV), an active format description is typically used to indicate to the display device the format of content inside of a video. However, none of the conventional approaches attempts to minimize the disruption caused by the aspect ratio change at transition points.

Limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method for signaling changes in aspect ratio of media content is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed system and method for signaling changes in aspect ratio of media content. Such method, when executed on the system, installed on a broadcasting transmission station or on a media server, may preempt any upcoming change in aspect ratio of video content and may automatically signal information indicative of such an upcoming change to an electronic device (such as an Advanced Television Systems Committee (ATSC) receiver, an OTT device, or a TV). To signal the information, the system may acquire a video stream to be transmitted to the electronic device and may further determine aspect ratio information associated content that may be included in the video stream. Thereafter, the system may determine a change in an aspect ratio of the content based on the aspect ratio information. The change may be from a first value at a first timestamp to a second value at a second timestamp for a duration of the content. The system may signal information indicative of the determined change to the electronic device.

Services based on OTT formats, ATSC, or other similar broadcast standards typically support multiple aspect ratios. In some instances, aspect ratio can change suddenly while rendering content. This sudden change in the aspect ratio of video content may degrade a viewing experience of the user or may even result in some discomfort due to the sudden discontinuity. None of the conventional approaches attempt to minimize the disruption at transition points (where aspect ratios change) in rendering of the content.

The disclosed system may be capable of signaling information to the electronic device about an upcoming change in the aspect ratio of the content before the content is rendered with a different aspect ratio is rendered on the display. The signaled information may include a timestamp at which the change in the aspect ratio may be scheduled. Based on the signaled information, the electronic device may be made aware of the change in advance and the electronic device may modify the content during a transition period by application of a transition effect to reduce the suddenness of the transition to the new aspect ratio of the content. The electronic device may use various techniques to minimize a viewing disruption of the aspect ratio change. As an example, the original content may fade out, and the content with the new aspect video may fade in.

Figure 1:
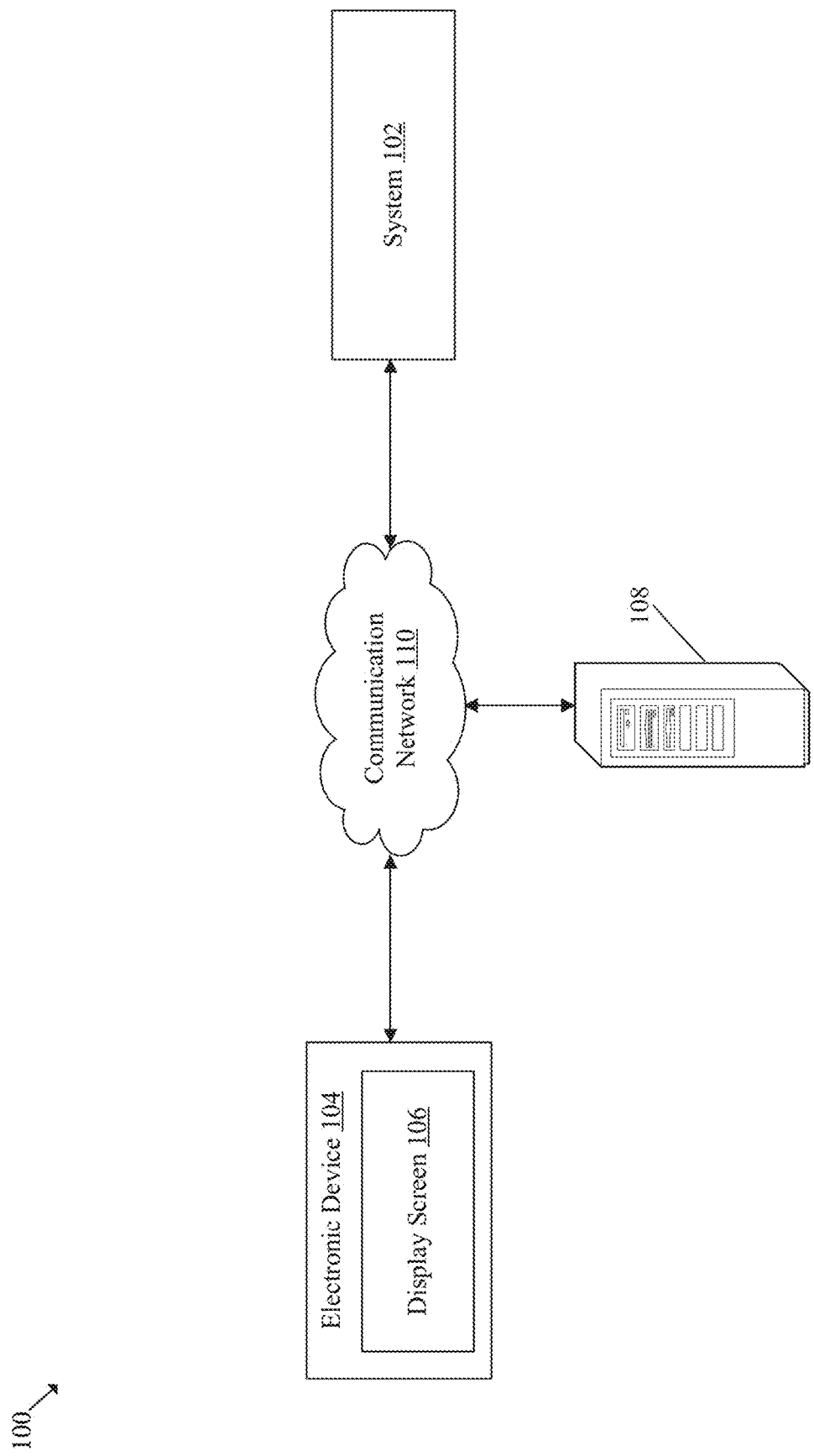
FIG. 1 is a block diagram that illustrates an exemplary network for signaling changes in aspect ratio of media content, in accordance with an embodiment of the disclosure.

FIG. 1 is a block diagram that illustrates an exemplary network for signaling changes in aspect ratio of media content, in accordance with an embodiment of the disclosure. With reference to FIG. 1, there is shown a network environment 100. The network environment 100 may include a system 102, an electronic device 104, a display screen 106, a server 108, and a communication network 110.

The system 102 may include suitable logic, circuitry, interfaces, and or code that may be configured to determine a change in aspect ratio of content included in a video stream and signal information indicative of the determined change to the electronic device 104. Example implementations of the system 102 may include, but are not limited to, a broadcasting station, an Internet Protocol television (IPTV) transmitter, an Advanced Television Systems Committee (ATSC) transmitter, and a content delivery network (CDN) server, a delivery and signaling server, or a media server for an OTT service.

The electronic device 104 may include suitable logic, circuitry, and interfaces that may be configured to receive the video stream and information indicative of the change in the aspect ratio of content included in the video stream. While the content is rendered on a display, the electronic device 104 may apply a transition effect based on the information. In an embodiment, the electronic device 104 may include a display screen 106. Example implementations of the electronic device 104 may include, but are not limited to, a smart television (TV), an Internet-Protocol TV (IPTV), a digital media player (DMP), a micro-console, a set-top-box, an Over-the-Top (OTT) player, an ATSC receiver, a digital media streamer, a media extender/regulator, a digital media hub, a smartphone, a personal computer, a laptop, a tablet, a wearable electronic device, or any other display device with a capability to receive, decode, and play content encapsulated in broadcasting signals from cable or satellite networks, over-the-air broadcast, or internet-based communication signals.

The display screen 106 may include suitable logic, circuitry, and interfaces that may be configured to render the content included in the received video stream. The display screen 106 may be a touch screen which may enable a user to provide a user-input via the display screen 106. The display screen 106 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display screen 106 may refer to a display screen of a head mounted device (HMD), a smart-glass device, a see-through display, a projection-based display, an electro-chromic display, or a transparent display.

In an embodiment, the display screen 106 may be integrated within the electronic device 104. In another embodiment, the display screen 106 may be comm communicatively coupled with the electronic device, via an external connection (such as via the communication network 110).

The server 108 may include suitable logic, circuitry, interfaces, and code that may be configured to store the video stream, the aspect ratio information, and change(s) in the aspect ratio of content included in the video stream. The server 108 may be configured to also store timing information for the change(s) and information to be shared with the electronic device 104. In an embodiment, the server 108 may be configured to also store the content to be rendered on the display screen 106. The server 108 may be implemented as a cloud server which may execute operations through web applications, cloud applications, HTTP requests, repository operations, file transfer, and the like. Other examples of the server 108 may include, but are not limited to a media server, a database server, a file server, a web server, an application server, a mainframe server, a cloud server, or other types of servers. In one or more embodiments, the server 108 may be implemented as a plurality of distributed cloud-based resources by use of several technologies that are well known to those skilled in the art.

The communication network 110 may include a communication medium through which the system 102, the electronic device 104, the display screen 106, and the server 108 may communicate with each other. The communication network 110 may include a wired or wireless communication network. Examples of the communication network 110 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 110, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the system 102 may be configured to acquire a video stream to be transmitted to the electronic device 104. In accordance with an embodiment, the video stream may correspond to an uncompressed video or a compressed video. The compressed video may correspond to, for example, lightly encoded content or mezzanine encoded content. The video stream may include content (e.g., video and audio data) and metadata associated with the video stream. Depending on a type of service, the video stream may be prepared and packaged for transmission to user devices (such as the electronic device 104). For example, the video stream may be packaged and prepared as an ATSC 3.0 video stream for a broadcast standard such as ATSC 3.0.

In accordance with an embodiment, the video stream may be an upcoming portion of a larger video stream to be transmitted to the electronic device 104. A portion of the larger video stream may have previously been transmitted to the electronic device 104 via an active streaming connection or a broadcast signal (e.g., an OTA signal that includes a DTV signal).

Upon acquisition, the system 102 may be configured to determine aspect ratio information associated content included in the acquired video stream. For example, the system 102 may determine the aspect ratio information from the metadata. Details related to determination of the aspect ratio information are provided, for example, in FIG. 3.

The system 102 may be configured to further determine a change in an aspect ratio of the content based on the aspect ratio information. The change in the aspect ratio may be from a first value at a first timestamp to a second value at a second timestamp for a duration of the content. Details related to determination of such a change are provided, for example, in FIG. 3. Thereafter, the system 102 may signal information indicative of the determined change to the electronic device 104. Such information may be signaled as in-band metadata (i.e., the metadata included in the video stream) or may be signaled as out-of-band metadata that may be separate from the video stream. In both cases, the information may be signaled before the content of the video stream is rendered on the display screen 106. Upon reception, such information may enable the electronic device 104 to preempt the change and to apply a suitable transition effect on the content while rendering the content on the display screen 106.

In an embodiment, the system 102 may be configured to update the video stream to include the information in the metadata associated with the video stream. The system 102 may be further configured to transmit the updated video stream to the electronic device 104. The information may be signaled via the updated video stream.

In some instances, the metadata may indicate a certain aspect ratio (e.g., 16:9) but the actual active video may have a different aspect ratio (e.g., 21:9, i.e., theatrical content). In such a case, the electronic device 104 (e.g., TV) may detect a horizontal area (i.e. bar(s)) above and below an active display area of the electronic device 104. The electronic device 104 may determine the aspect ratio of the active video based on a vertical height of the bar(s) and may apply a transition effect when a change or transition occurs in the active video. For example, the change or transition may correspond to a TV commercial that may be inserted at certain slots in a playback duration of the active video. It may be assumed that the aspect ratio of the commercial is not the same as that of the actual active video (e.g., 21:9). The transition effect may be applied in the playback duration to reduce a suddenness (or abruptness) of the change in the aspect ratio and to enhance a viewing experience of the active video.

Figure 2:
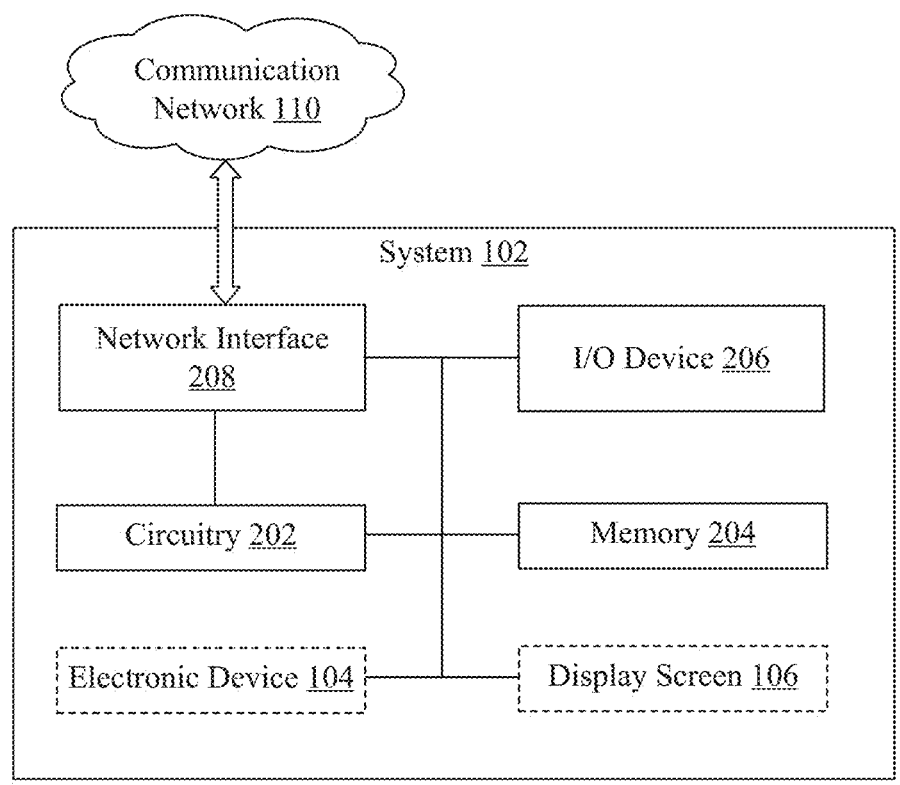
FIG. 2 is a block diagram that illustrates an exemplary system for signaling changes in aspect ratio of media content, in accordance with an embodiment of the disclosure.

FIG. 2 is a block diagram that illustrates an exemplary system for signaling changes in aspect ratio of media content, in accordance with an embodiment of the disclosure. FIG. 2 is explained in conjunction with elements from FIG. 1. With reference to FIG. 2, there is shown a block diagram 200 of the system 102. The system 102 may include circuitry 202 which may perform the plurality of operations for signaling changes in aspect ratio of media content. The system 102 may further include a memory 204, an input/output (I/O) device 206, and a network interface 208. The circuitry 202 may be communicatively coupled to the memory 204, the I/O device 206, and the network interface 208.

The circuitry 202 may include suitable logic, circuitry, and interfaces that may be configured to execute program instructions associated with different operations to be executed by the system 102. The circuitry 202 may include one or more processing units, which may be implemented as separate processor units, an integrated processor unit, or a cluster of processors that collectively performs functions of the one or more processing units. The circuitry 202 may be implemented based on a number of processor technologies known in the art. Examples of implementations of the circuitry 202 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, circuitry, interfaces, and/or code that may be configured to store the video stream, the aspect ratio information, the first value, the first timestamp, the second value, the second timestamp, and the information to be signaled to the electronic device 104. The memory 204 may be configured to also store the updated video stream, and timing information associated with the change. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, and interfaces that may be configured to receive the user input(s) and provide an output based on the received user input(s). The I/O device 206 may further render the content. The I/O device 206 which may include various input and output devices, which may be configured to communicate with the circuitry 202. Examples of the I/O device 206 may include, but are not limited to, a display device, an audio rendering device, a touch screen, a keyboard, a mouse, a joystick, and a microphone.

The network interface 208 may include suitable logic, circuitry, and interfaces that may be configured to facilitate communication between the circuitry 202, the electronic device 104, the display screen 106, and the server 108, via the communication network 110. The network interface 208 may be implemented by use of various known technologies to support wired or wireless communication of the system 102 with the communication network 110. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 208 may be configured to communicate via wireless communication with networks, such as the Internet, an Intranet, or a wireless network (such as a cellular telephone network, a wireless local area network (LAN), and a metropolitan area network (MAN)). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

Figure 3:
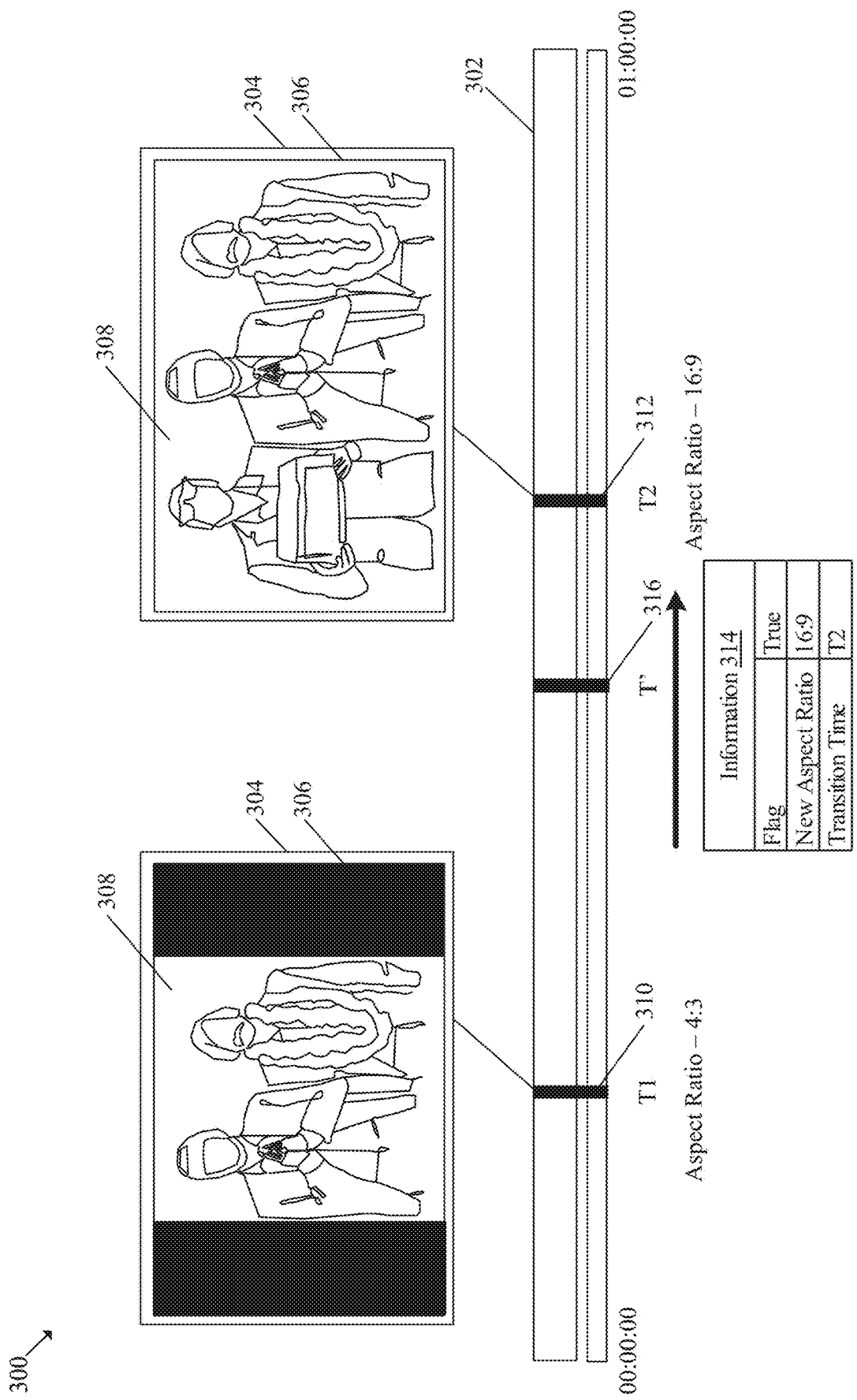
FIG. 3 is a diagram that illustrates an exemplary timeline for signaling changes in aspect ratio of media content, in accordance with an embodiment of the disclosure.

FIG. 3 is a diagram that illustrates an exemplary timeline for signaling changes in aspect ratio of media content, in accordance with an embodiment of the disclosure. FIG. 3 is explained in conjunction with elements from FIG. 1 and FIG. 2. With reference to FIG. 3, there is shown a diagram 300 that includes a timeline 302. There is further shown an electronic device 304 and a display screen 306. The electronic device 304 and the display screen 306 may be exemplary implementations of the electronic device 104 and the display screen 106 of FIG. 1, respectively. With reference to FIG. 3, there is further shown content 308 of a video stream.

The system 102 may be configured to acquire a video stream. Typically, the video stream is a standard digital container format for transmission and storage of audio, video, program, and system data. As an example, the video stream may be an encoded stream (e.g., Moving Picture Experts Group (MPEG) encoded and ready for distribution to an end-user). In accordance with an embodiment, the video stream may correspond to an uncompressed video or a compressed video. The compressed video may correspond to, for example, lightly encoded content or mezzanine encoded content.

The system 102 may acquire the video stream from a broadcasting station or a server, such as a content provider server, a content delivery network, an edge server, an advertisement server, or a combination thereof. The acquired video stream may include content 308 and metadata associated with the video stream. In an embodiment, the metadata may be associated with the content 308 and may include aspect ratio information associated with the content 308. The aspect ratio information may include a series of aspect ratio values for a duration of the content 308. For a timestamp in the duration, the aspect ratio may be described as a ratio of width to height of the content 308 at the timestamp.

In accordance with an embodiment, the circuitry 202 may be configured to determine aspect ratio information from the metadata associated with the content 308. Based on the aspect ratio information, the circuitry 202 may be configured to determine a change in an aspect ratio of the content 308. The determined change in the aspect ratio may be from a first value (e.g., 4:3) at a first timestamp (T1) 310 to a second value (e.g., 16:9) at a second timestamp (T2) 312 for a duration of the content 308.

In some scenarios, the change may be determined while the content is encoded for the video stream. In such a case, the circuitry 202 may be configured to analyze the content 308 and determine the change in the aspect ratio of the content 308 based on the analysis. The analysis may include determination of resolution values of video frames (included in the content 308) at different timestamps and a comparison of successive resolution values. If a resolution value is determined to be different from preceding resolution values, then that resolution value may correspond to a change in the aspect ratio. The timestamp (or a suitable frame identifier) that corresponds to the change of the aspect ratio (or such a resolution value) may be determined to identify a video frame beyond which all successive video frames of the content 308 have the resolution value.

Based on the determined change, the circuitry 202 may be configured to generate information 314 indicative of the determined change. By way of example, and not limitation, the generated information 314 may include a flag, the second value of the aspect ratio, and timing information. The flag may be indicative of the determined change and may be set to True. The timing information may include the second timestamp (T2) 312 at which the first value of the aspect ratio changes to the second value of the aspect ratio.

The circuitry 202 may be further configured to signal the generated information 314 to the electronic device 304. In an embodiment, the information 314 indicative of the change may be signaled to the electronic device 304 before the video stream is transmitted to the electronic device 304. In an embodiment, the information 314 may be transmitted to the electronic device 304 at a time that correspond to an intermediate timestamp (T' or T-prime) 316 between the first timestamp (T1) 310 and the second timestamp (T2) 312. In another embodiment, the information 314 indicative of the change may be transmitted along with the video stream to the electronic device 304. In such a case, the circuitry 202 may be configured to update the video stream to include the information 314 in the metadata. The circuitry 202 may transmit the updated video stream to the electronic device 304. In this case, the information 314 may be signaled via the updated video stream.

The electronic device 304 may receive the updated video stream. Upon reception, the electronic device 304 may detect the change based on the information included in the updated video stream. Based on the detected change, the electronic device 304 may be configured to control the display screen 306 to render the content 308 included in the received video stream. The electronic device 304 may apply a transition effect over a content portion of at least one of the rendered content 308 or a media rendered immediately before the content 308 is rendered. The transition effect may be applied based on the information 314 to reduce the suddenness of the change in the aspect ratio of the content. Details about the application of the transition effect are provided, for example, in FIG. 4.

In an embodiment, the signaled information 314 may also include the transition effect to be applied over the content portion. The signaled information 314 may also include a timestamp at which the transition effect should be applied on the content portion while rendering the content portion on the display screen 306. The transition effect may include, but is not limited to, an alpha rendering animation, an anamorphic zooming animation, or an animation.

In an exemplary scenario, the duration of the content may be of 1 hour. The timeline 302 may correspond to the duration of the content 308 (i.e., the timeline may be for 1 hour). In the timeline, the first timestamp (T1) 310 and the second timestamp (T2) 312 are displayed. The aspect ratio of the content 308 may change from the first value at the first timestamp (T1) 310 to the second value at the second timestamp T2 312. As an example, the first value of the aspect ratio may be 4:3 and the second value of the aspect ratio may be 16:9. From the first timestamp T1 310 until the second timestamp T2 312, the circuitry 202 may control the display screen 306 of the electronic device 304 to render the content in aspect ratio of 4:3. Just before the second timestamp T2 312 (e.g., at the intermediate timestamp T' 316 or just after the intermediate timestamp T' 316), the circuitry 202 may control the display screen 306 of the electronic device 304 to apply the transition effect over the content portion of at least one of the rendered content 308 or a media that may be rendered immediately before the content 308 may be rendered. From the second timestamp T2 312 onwards, the circuitry 202 may control the display screen 306 of the electronic device 304 to render the content 308 with an aspect ratio of 16:9.

In accordance with embodiment, the circuitry 202 may be configured to determine an active display area that may be available on the display screen 306 of the electronic device 304 for the render of the content 308. Specifically, the circuitry 202 may determine an aspect ratio of the active display area. The information may be signaled to the electronic device 304 further based on the active display area. This may be done in scenarios in which the active display area can vary (e.g., player window is resizable) or active display area (i.e., the size of the player) is set to a custom size, i.e., a size different from a default player window size or full screen size.

Figure 4:
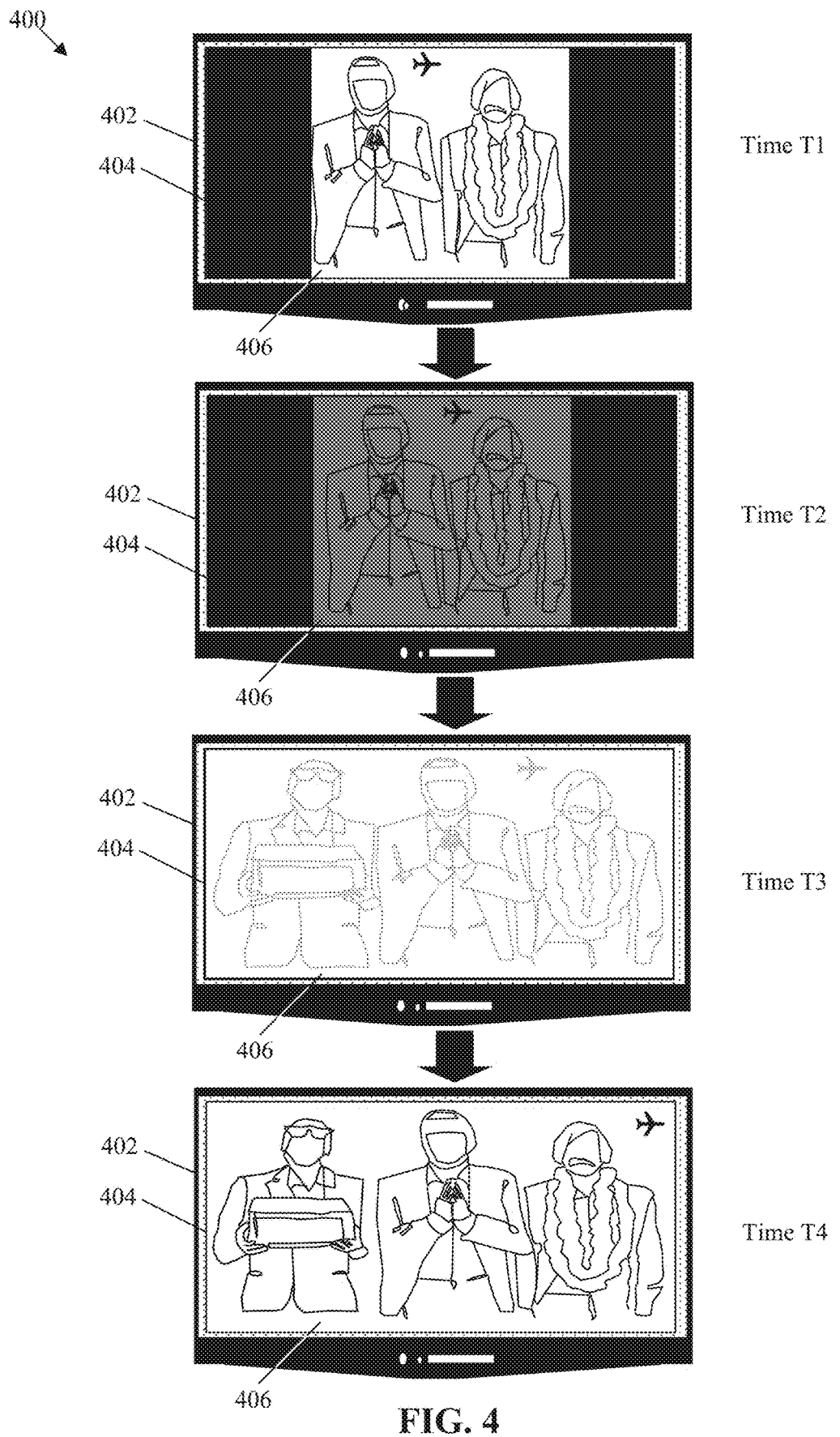
FIG. 4 is a diagram that illustrates an exemplary scenario in which content is rendered in accordance with different aspect ratios on a display screen, in accordance with an embodiment of the disclosure.

FIG. 4 is a diagram that illustrates an exemplary scenario in which content is rendered in accordance with different aspect ratios on a display screen, in accordance with an embodiment of the disclosure. FIG. 4 is explained in conjunction with elements from FIG. 1, FIG. 2, and FIG. 3. With reference to FIG. 4, there is shown a scenario diagram 400. There is further shown an electronic device 402 that includes a display screen 404. Views of the display screen 404 are shown at time T1, T2, T3, and T4. The electronic device 402 may be an exemplary implementation of the electronic device 104 and the display screen 404 may be an exemplary implementation of the display screen 106. In a playback timeline, time T1 may precede time T2, T2 may precede time T3, and T3 may precede time T4.

At time T1, the electronic device 402 may receive a video stream. The electronic device 402 may receive the video stream from the system 102 that may be implemented in a broadcasting station or the server 108 (in case of OTT services). The received media stream may include content 406 and metadata associated with the content 406. The metadata may include aspect ratio information that may indicate an aspect ratio of the content 406 included in the media stream along with other properties of the content 406 such as a name of one or more actors, a genre of the content, a duration of the content, and the like. At time T1, the aspect ratio of the content 406 may be a first aspect ratio (say 4:3). The electronic device 402 may control the display screen 404 to render the content 406 included in the media stream in the first aspect ratio.

After time T1, the system 102 may be configured to determine the aspect ratio information associated with the content and a change in the aspect ratio of the content based on the aspect ratio information. The determined change of the aspect ratio may be from a first value (i.e., 4:3) at the first timestamp (i.e., at T1) to a second value (say 10:9) at a second timestamp (at T4). Based on the detected change, the system 102 may be configured to signal information indicating the change to the electronic device 402 at time T1. In another embodiment, the system 102 may be configured to update the video stream. The updated video stream may indicate the detected change. The system 102 may transmit the updated video stream to the electronic device 402.

The electronic device 402 may receive the updated video stream and may detect the change based on information included in the updated video stream. As discussed above, the change in the aspect ratio may be from the first value at the first timestamp to the second value at the second timestamp.

From time T2 to T3, the electronic device 402 may be configured to control a display (i.e., the display screen 404) to render the content included in the received video stream. Within a duration T2-T3, the electronic device 402 may apply a transition effect over a content portion of at least one of the rendered content or a media that may be rendered immediately before the content is rendered. The transition effect may be applied immediately before the second timestamp (i.e., T4). By way of example, and not limitation, the transition effect may include an alpha rendering animation, an anamorphic zooming animation, an animation, and the like. As shown, for example, a fade-out and fade-in animation is applied on the content 406.

In an embodiment, the transition effect may be applied based on the signaled information. Specifically, at time T2, the content 406 with the first value of aspect ratio may fade out. Similarly, at time T3, the content 406 with the second value of the aspect ratio may fade in.

At time T4, the electronic device 402 may be configured to control the display screen 404 to display a portion of the content that corresponds to the second value of the aspect ratio. As shown, for example, the content 406 with the second aspect ratio (i.e., in 10:9) is rendered on the display screen 404.

The transition effect may be applied immediately before the aspect ratio changes. This may be done to reduce a suddenness (or abruptness) of the change in the aspect ratio and to enhance a viewing experience of the content 406.

Figure 5:
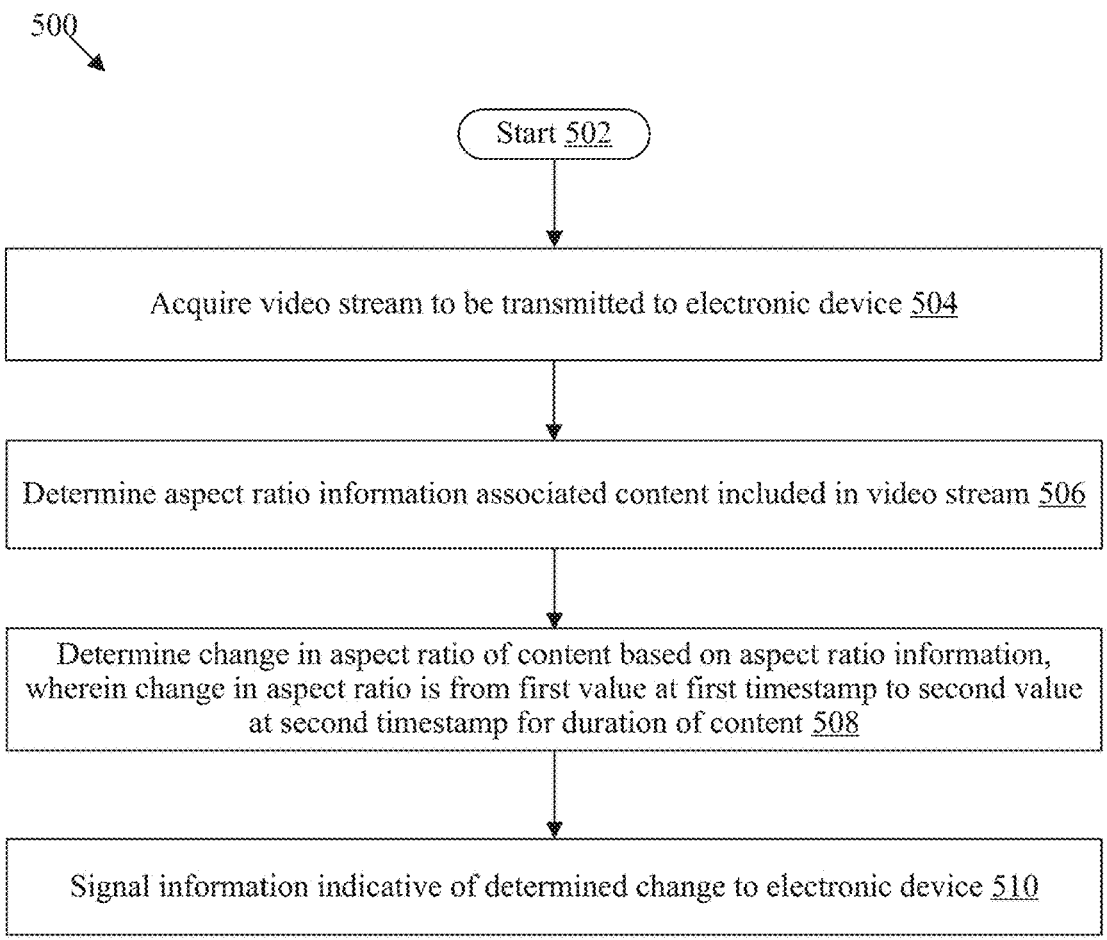
FIG. 5 is a flowchart that illustrates exemplary operations for signaling changes in aspect ratio of media content, in accordance with an embodiment of the disclosure.

FIG. 5 is a flowchart that illustrates exemplary operations for signaling changes in aspect ratio of media content, in accordance with an embodiment of the disclosure. FIG. 5 is explained in conjunction with elements from FIG. 1, FIG. 2, FIG. 3, and FIG. 4. With reference to FIG. 5, there is shown a flowchart 500. The operations from 502 to 510 may be implemented on any computing device, for example, the system 102 or the circuitry 202. The operations may start at 502 and proceed to 504.

At 504, the video stream to be transmitted to the electronic device 104 may be acquired. In one or more embodiments, the circuitry 202 may be configured to acquire the video stream to be transmitted to the electronic device 104. The details about the acquiring the first video stream are provided, for example, in FIGS. 1, and 3.

At 506, the aspect ratio information associated with the content that may be included in the video stream may be determined. In one or more embodiments, the circuitry 202 may be configured to determine the aspect ratio information associated with the content that may be included in the video stream. The details about the determination of the aspect ratio information are provided for example, in FIGS. 1, and 3.

At 508, the change in the aspect ratio of the content may be determined based on the aspect ratio information, wherein the change in the aspect ratio may be from the first value at the first timestamp to the second value at the second timestamp for the duration of the content. In one or more embodiments, the circuitry 202 may be configured to determine the change in the aspect ratio of the content based on the aspect ratio information, wherein the change in the aspect ratio is from the first value at the first timestamp to the second value at the second timestamp for the duration of the content. The details about the determination of the change are provided for example, in FIGS. 1, 3, and 4.

At 510, the information that may be indicative of the determined change may be signaled to the electronic device 104. In one or more embodiments, the circuitry 202 may be configured to signal the information indicative of the determined change to the electronic device 104. The details about the first ML model 106A are provided for example, in FIGS. 1, 3, and 4. Control may pass to end.

Various embodiments of the disclosure may provide a non-transitory computer-readable medium and/or storage medium having stored thereon, computer-executable instructions executable by a machine and/or a computer such as the system 102. The computer-executable instructions may cause the machine and/or computer to perform operations that may include acquiring a video stream to be transmitted to an electronic device (such as the electronic device 104). The operations may further include determining aspect ratio information associated with content included in the video stream. The operations may further include determining a change in an aspect ratio of the content based on the aspect ratio information. The change in the aspect ratio may be from a first value at a first timestamp to a second value at a second timestamp for a duration of the content. The operation may further include signaling information indicative of the determined change to the electronic device.

Exemplary aspects of the disclosure may include a system (such as the system 102 of FIG. 1) that may include circuitry (such as the circuitry 202 of FIG. 2). The circuitry may be configured to acquire a video stream to be transmitted to an electronic device (such as the electronic device 104 of FIG. 1). The acquired video stream includes metadata associated with the video stream. The circuitry may determine aspect ratio information associated with content included in the video stream from the metadata. The circuitry may further determine a change in an aspect ratio of the content based on the aspect ratio information. In an embodiment, the circuitry may determine the change based on analysis of the content. The change in the aspect ratio may be from a first value at a first timestamp to a second value at a second timestamp for a duration of the content. The circuitry may further signal information indicative of the determined change to the electronic device.

In accordance with an embodiment, the circuitry may be configured to update the video stream to include the information in the metadata and further transmit the updated video stream to the electronic device. In such scenario, the information may be signaled via the updated video stream.

In accordance with an embodiment, the electronic device may be configured to receive the updated video stream. The electronic device may be configured to detect the change based on the information included in the updated video stream. The electronic device may be configured to control a display screen (such as the display screen 106 of FIG. 1) to render the content included in the received video stream. The electronic device may be further configured to apply a transition effect over a content portion of at least one of the rendered content or a media that may be rendered immediately before the content is rendered. The transition effect may be applied based on the information. The information may include the transition effect to be applied over the content portion. The transition effect may include an alpha rendering animation, an anamorphic zooming animation, or an animation.

In accordance with an embodiment, the information may include a flag that may be set to true to indicate the change, the second value of the aspect ratio, and timing information that includes the second timestamp at which the first value of the aspect ratio changes to the second value of the aspect ratio. In an embodiment, the information indicative of the change may be signaled to the electronic device before the video stream is transmitted to the electronic device.

In accordance with an embodiment, the circuitry may determine an active display area that may be available on the display screen of the electronic device for a render of the content. The circuitry may be further configured to signal the information to the electronic device based on the active display area.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the embodiment disclosed, but that the present disclosure will include all embodiments that fall within the scope of the appended claims.

What is claimed is:

1. A system, comprising:
    circuitry configured to:
        acquire a video stream to be transmitted to an electronic device;
        determine aspect ratio information associated with content, wherein the video stream includes the content;
        determine, based on the aspect ratio information, a change in an aspect ratio of the content, wherein
            the change in the aspect ratio is from a first value at a first timestamp to a second value at a second timestamp for a duration of the content; and
        signal information indicative of the determined change to the electronic device, wherein the signal information comprises:
            a flag that is set to true to indicate the change in the aspect ratio of the content,
            the second value of the aspect ratio, and
            timing information that includes the second timestamp at which the first value of the aspect ratio changes to the second value of the aspect ratio.

2. The system according to claim 1, wherein
    the video stream includes metadata associated with the video stream, and
    the circuitry is further configured to determine the aspect ratio information from the metadata.

3. The system according to claim 2, wherein the circuitry is further configured to:
    update the video stream to include the signal information in the metadata,
    transmit the updated video stream to the electronic device, and signal the information via the updated video stream.

4. The system according to claim 3, wherein the electronic device is configured to:
    receive the updated video stream;
    detect the change based on the information included in the updated video stream;
    control a display screen to render the content included in the received video stream; and
    apply, based on the information, a transition effect over a content portion of at least one of the rendered content or a media, wherein the media is rendered immediately before the rendered content.

5. The system according to claim 4, wherein the information includes the transition effect to be applied over the content portion.

6. The system according to claim 4, wherein the transition effect includes one of an alpha rendering animation, an anamorphic zooming animation, or an animation.

7. The system according to claim 1, wherein the circuitry is further configured to determine the change based on an analysis of the content.

8. The system according to claim 1, wherein the circuitry is further configured to signal the information indicative of the change to the electronic device before the video stream is transmitted to the electronic device.

9. The system according to claim 1, wherein the circuitry is further configured to:
    determine an active display area that is available on a display screen of the electronic device for a render of the content; and
    signal the information to the electronic device based on the active display area.

10. The system according to claim 1, wherein the video stream corresponds to one of an uncompressed video or a compressed video.

11. A method, comprising:
acquiring a video stream to be transmitted to an electronic device;
determining aspect ratio information associated with content, wherein the video stream includes the content;
determining, based on the aspect ratio information, a change in an aspect ratio of the content, wherein
the change in the aspect ratio is from a first value at a first timestamp to a second value at a second timestamp for a duration of the content; and
signaling information indicative of the determined change to the electronic device, wherein the information comprises:
a flag that is set to true to indicate the change in the aspect ratio of the content,
the second value of the aspect ratio, and
timing information that includes the second timestamp at which the first value of the aspect ratio changes to the second value of the aspect ratio.

12. The method according to claim 11, further comprising:
determining the aspect ratio information from metadata.

13. The method according to claim 12, further comprising:
updating the video stream to include the information in the metadata,
transmitting the updated video stream to the electronic device, and
signaling the information via the updated video stream.

14. The method according to claim 13, further comprising:
receiving, by the electronic device, the updated video stream;
detecting, by the electronic device, the change based on the information included in the updated video stream;
controlling, by the electronic device, a display screen to render the content included in the received video stream; and
applying, by the electronic device, based on the information, a transition effect over a content portion of at least one of the rendered content or a media, wherein the media is rendered immediately before the rendered content.

15. The method according to claim 14, wherein the information includes the transition effect to be applied over the content portion.

16. The method according to claim 14, wherein the transition effect includes one of an alpha rendering animation, an anamorphic zooming animation, or an animation.

17. The method according to claim 11, further comprising determining the change based on an analysis of the content.

18. A non-transitory computer-readable medium having stored thereon, computer-executable instructions that when executed by a processor of a system, causes the processor to execute operations, the operations comprising:
acquiring a video stream to be transmitted to an electronic device;
determining aspect ratio information associated with content, wherein the video stream includes the content;
determining, based on the aspect ratio information, a change in an aspect ratio of the content, wherein
the change in the aspect ratio is from a first value at a first timestamp to a second value at a second timestamp for a duration of the content; and
signaling information indicative of the determined change to the electronic device, wherein the information comprises:
a flag that is set to true to indicate the change in the aspect ratio of the content,
the second value of the aspect ratio, and
timing information that includes the second timestamp at which the first value of the aspect ratio changes to the second value of the aspect ratio.

* * * * *